(12) United States Patent
Wolf

(10) Patent No.: US 7,619,584 B2
(45) Date of Patent: Nov. 17, 2009

(54) MESSAGING INCLUDING ACTIVE RESPONSE FEATURE

(75) Inventor: Jeffrey Wolf, Miami Beach, FL (US)

(73) Assignee: Generation One, Inc., Miami Beach, FL (US)

( * ) Notice: Subject to any disclaimer, the term of this patent is extended or adjusted under 35 U.S.C. 154(b) by 320 days.

(21) Appl. No.: 11/530,370

(22) Filed: Sep. 8, 2006

(65) Prior Publication Data

US 2008/0062133 A1    Mar. 13, 2008

(51) Int. Cl.
G09G 5/00 (2006.01)
G06F 15/16 (2006.01)

(52) U.S. Cl. .................. 345/1.2; 345/2.1; 345/172; 345/173; 715/744; 715/752; 715/763; 455/466; 709/203; 709/206

(58) Field of Classification Search .......... 345/168, 345/172, 173, 184, 1.1; 715/701, 702, 744, 715/746, 747, 752, 763; 709/203, 206, 204, 709/207; 455/412.2, 418, 420
See application file for complete search history.

(56) References Cited

U.S. PATENT DOCUMENTS

| 5,719,918 | A | 2/1998 | Serbetciouglu et al. |
| 5,794,142 | A | 8/1998 | Vanttila et al. |
| 5,845,203 | A | 12/1998 | LaDue |
| 6,014,089 | A | 1/2000 | Tracy et al. |
| 6,150,955 | A | 11/2000 | Tracy et al. |
| 6,289,214 | B1 | 9/2001 | Backstrom |
| 6,393,297 | B1 | 5/2002 | Song |
| 6,529,729 | B1 | 3/2003 | Nodoushani et al. |
| 6,781,962 | B1 | 8/2004 | Williams et al. |
| 6,820,049 | B1 | 11/2004 | Monroe et al. |
| 6,836,737 | B2 | 12/2004 | Petite et al. |
| 6,900,737 | B1 | 5/2005 | Ardalan et al. |
| 6,950,660 | B1 | 9/2005 | Hsu et al. |
| 7,127,264 | B2 * | 10/2006 | Hronek et al. ............. 455/466 |
| 7,321,920 | B2 * | 1/2008 | Washburn .................. 709/206 |
| 2002/0098874 | A1 | 7/2002 | Zirul et al. |
| 2003/0097406 | A1 | 5/2003 | Stafford |

(Continued)

FOREIGN PATENT DOCUMENTS

EP    1 496 677    10/2003

OTHER PUBLICATIONS

Patent Cooperation Treaty International Search Report; International Application No. PCT/US07/76545, filed Aug. 22, 2007; Applicant Mobix Communications, Inc.

*Primary Examiner*—Henry N Tran
(74) *Attorney, Agent, or Firm*—Law Office of Donald D. Mondul

(57) ABSTRACT

An enhanced messaging capability which enables the recipient of the message to respond to a query by pressing a single button or multiple buttons to issue the response. Code for enabling a receiving device to display the message and provide simplified response options is carried by a messaging format such as SMS, MMS, etc., in which a web browser application is not required nor invoked to permit active response functionality. A mechanism is provide to allow delivery of response in a variety of formats. The system may automatically take a selected action if a response is not received within a present time period. A message and response system greatly simplified from the senders and recipients perspective is provided.

21 Claims, 7 Drawing Sheets

U.S. PATENT DOCUMENTS

| | | |
|---|---|---|
| 2004/0033798 A1 | 2/2004 | Robin et al. |
| 2004/0186889 A1 | 9/2004 | Washburn |
| 2005/0043063 A1 | 2/2005 | Dinn |
| 2005/0153729 A1 | 7/2005 | Logan et al. |
| 2005/0188090 A1 | 8/2005 | Washburn |
| 2005/0210114 A1 | 9/2005 | Washburn |
| 2005/0288044 A1 | 12/2005 | Atkins et al. |
| 2006/0035651 A1 | 2/2006 | Arponen et al. |
| 2006/0259566 A1 | 11/2006 | Hyakutake et al. |
| 2007/0139382 A1 | 6/2007 | Kotipalli |
| 2007/0192708 A1 | 8/2007 | Lee et al. |

* cited by examiner

Reminder Configuration

Notification

Name of Person [ ] — 502

Mode ☐ Email ☐ SMS ☐ Web Posting ☐ Phone Call — 504

Email [ ] — 506

Phone (SMS) [ ] — 508

Phone (Call) [ ] — 510

Reply function [ Yes ▽ ] — 512

[ Add Another Person to Notify ] — 514   [ Save ] — 516

MESSAGING INCLUDING ACTIVE RESPONSE FEATURE

BACKGROUND OF THE INVENTION

The present invention is related to the field of telecommunications. More particularly the present invention is related to personal communication between a sender and receiver that enables the receiver to communicate with minimum knowledge, experience or effort.

Communicating through devices using various telecommunication technologies is very common in today's world. In particular, communication through wireless telecommunication technologies and assisting devices is becoming more prevalent. With the advancement of technology, today people can talk, access the Internet, and send messages using a single device. More particularly, messaging using these devices is becoming a very popular way of communication. While it is popular, messaging, particularly using a point-to-point communication device (such as a telephone handset, cellular phone, etc.) presents many users with a number of challenges. Such challenges exist, for example, because of the time it takes to respond or the complexity in responding to these messages.

Particularly, in the case of young people, elderly people, people in a hurry or others with limited ability to see and type using a standard point-to-point communications device, it is desirable to provide a device designed for simplified interaction, such as a "one-touch" response. While efforts have been made to design devices with more convenient or simplified interfaces, each have limitations and disadvantages and fail to adequately solve the problem of a truly simplified device interface, particularly for facilitating responses to various types of messages.

For example, published U.S. application 2004/0186889 discloses the provision of "one-touch" response for messages in telecommunication devices by sending response options along with the message that are mapped with identified keys. The sender composes a message by filling in a template stored on a server. Once completed, the sender pushes the message to a recipient's wireless device if the wireless device contains a WAP browser which is capable of receiving pushed messages. Typically, the message includes a question along with several responses from which the recipient may choose. Each response corresponds with a pre-assigned response key and the recipient answers the question by selecting one of the pre-assigned response keys. The recipient's response is available to the sender in the form of an e-mail, WAP Push, via on-line access or so-called instant message that is displayed to the sender.

In another example, European patent application EP1496677 discloses a communication apparatus having programmable softkeys, especially for sending data, e.g., by means of tone signals. The apparatus stores sets of softkeys, wherein the softkeys are associated with sending predefined data. The softkeys may be programmed by the user or by receiving a configuration message automatically installing the softkey function. The invention also relates to a method of programming softkeys in such an apparatus by using a softkey editor or installing a set-up file in the apparatus received from a server. The softkey set-up file may be transmitted by means a short message service (SMS) or other protocol.

Each of the aforementioned references has technical limitations addressed by the present invention. Published U.S. application 2004/0186889 operates only with WAP enabled devices, and European application EP1496677 requires softkey map files to be pre-programmed and stored in the memory of a device and does not enable a message sender to easily create a message, optional responses, and selectable associated response keys on the recipient's device. The present invention provides an apparatus and method which overcome these and other limitations, providing an improved and simplified interface for telecommunications devices such as wireless telephones and the like.

SUMMARY OF THE INVENTION

According to the present invention, there is provided a method and system for sending and receiving communications, the communications formatted typically in the SMS format or other standard formats as well, which cause the receiving device to both relay information to a recipient and provide the recipient with simple response options. The receiving device can be programmed to ask follow-on questions (or provide follow-on information) based upon the initial user response. The receiving device may include a programmable memory which holds follow-up questions, other information, etc or be programmed via a coded message to hold follow-up questions, other information, etc. Response to the communication may be optional, or the system may be programmed such that the sending device takes a particular action if no response is received.

According to one embodiment of the present invention, the system comprises a sending station (typically a networked computer terminal) and a receiving station (typically a wireless or cellular telephone handset). The sending station is provided with software which allows a sending user to create a message containing both text which can be displayed on the receiving station and instructions which cause the receiving station to display, typically as "softkeys," or a programmed function for an otherwise dedicated key (e.g., a number key) a number of response options. The receiving station typically includes software not only for displaying the text of the message, but also for interpreting the coded portion and enabling the softkeys (or other keys) for response. For the purposes herein, "softkeys" refers to a physical button located along the periphery of the device display, which may change function depending upon context, the function of the button usually indicated by the content of the display proximate thereto, as well as a button image rendered in a region of a device display such that the display senses when a user touches the region of the display and operates as if a physical button had been depressed, again with the function depending upon context, the function of the button usually indicated by the content of the display associated therewith.

According to one embodiment of the method of the present invention, a sending user enters text and creates or selects a number of response options to accompany the text. These are packaged and sent via a common communications protocol, specifically one not requiring the operation or even presence of a browser application (such as WAP), to the receiving station. Once received, the receiving station parses the message, displays the text, and causes the display and associated operations of the softkeys to be presented to the receiving user. The receiving user may select from one of the response options, for example by depressing a softkey (or a number or other key or combination of keys, if requested), which causes a transmission of the response to the sending user. This single step of depressing a selected response and having the response automatically transmitted to the sending user is referred to herein as "one step" response or process, although sending a response may also involve more than one step on certain occasions. Optionally, the sending user may require receipt of a response, and if no receipt is received within a specified period of time, take some action, such as notifying the sender, notifying a third party, resending the original message, etc. In either case, the sent message is associated with a set of response options, and hence the method of the present invention may be referred to as messaging with an "active response" option.

According to another aspect of the present invention, the device itself (or a chip on the device), contains a range of pre-set questions or other information. This information is selectively released to the receiver by code embedded in the SMS message and may permit the creation of a dynamic range of questions appearing on the device. For instance, the device itself can contain 1000 questions labeled "1" to "1000". The SMS message may contain a code asking a question and then summoning questions "84" "345" and "247" to appear if the user answers one way, and questions "458", "894" and "345" to appear if the user answers in another way. According to one embodiment, all answers to these questions are sent back to the sender in single or multiple SMS messages as provided herein.

According to another aspect of the invention, the device may store new questions or other information as per the above (and delete existing questions and messages as needed). These messages may be added or deleted by SMS code which contains commands to store or delete questions that may be accessed via paragraph 10 above.

According to another aspect of the present invention, the SMS message sent to the device may contain multiple questions or information that may be answered in a sequential order such that all or some of the answers are sent back to the sender in a single or multiple SMS messages as provided herein.

According to another aspect of the present invention, the sender of the message can compose the message by using different interfaces, including a web-based user interface, a handheld or dedicated device, programming such messages into the device itself, an interactive voice response system, interacting with a live agent or operator or sending the SMS code (or other code) using any SMS (or other) server.

According to yet another aspect of the present invention, the message including response code enabling, for example, one step responses may be encoded according to a protocol other than SMS. Other protocols include, for example, multimedia messaging service (MMS), which builds on SMS by allowing the transmission of messages that include multimedia objects (images, audio, video, rich text), mobile instant messaging and mobile mail, etc.

According to still another aspect of the present invention, the sender of the message including response code can specify that the message be sent to multiple recipients, and may specify that the response issued by the recipient(s) be directed back to the sender, to another third person or the sender together with one or more others. Furthermore, the sender can specify the mode of receiving the response from the recipient, such as a return SMS message, an email notification, etc.

According to an additional aspect of the present invention, there is provided a mechanism to send a message including response code more than once, at the frequency and specific time as set by the sender, facilitating automated iteration of the reminder without further intervention from the sender. In addition, a mechanism may be provided to delay the message and softkey for response from appearing on the receiving station until a specified time or times. Furthermore, there may be provided a mechanism for a message including response code to program the receiving station to cause the same message or a variation of the message to reappear at selected times, at which times the receiver can issue a response.

The invention provides a single key response or multiple key responses to a query with an enhanced notification mechanism and the ability for the sender to maintain the notification for further reference. The limited range of responses facilitates the effective management of accumulated correspondence information.

The above is a summary of a number of the unique aspects, features, and advantages of the present invention. However, this summary is not exhaustive. Thus, these and other aspects, features, and advantages of the present invention will become more apparent from the following detailed description and the appended drawings, when considered in light of the claims provided herein.

BRIEF DESCRIPTION OF THE DRAWINGS

In the drawings appended hereto like reference numerals denote like elements between the various drawings. While illustrative, the drawings are not drawn to scale. In the drawings:

FIG. 5 is a diagram illustrating a Reminder Configuration inbox for web based interface to set the specifications of the response.

DETAILED DESCRIPTION OF THE INVENTION

Figure 1:
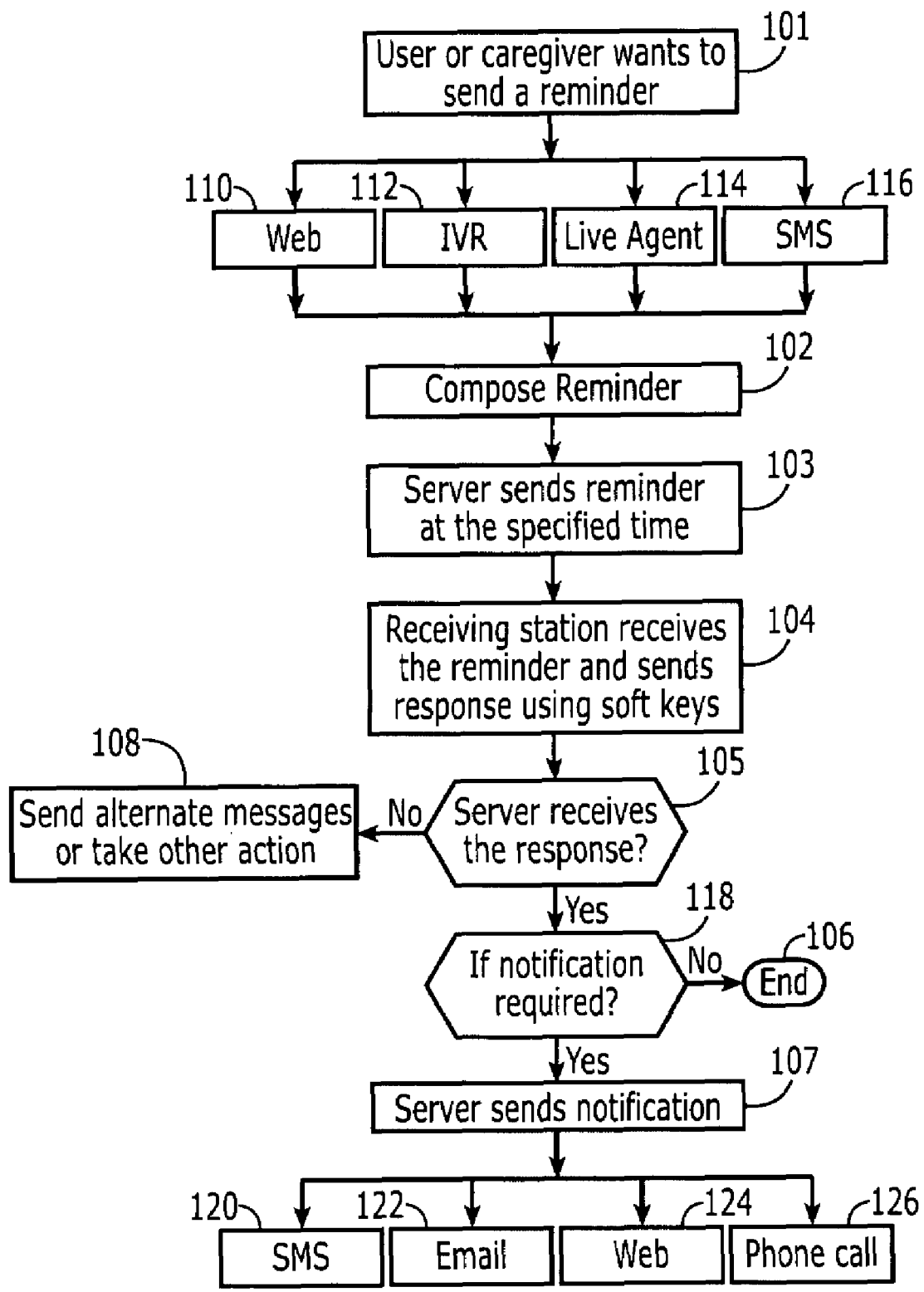
FIG. 1 is a flow chart illustrating the method to send message by activating keys on recipient's device to enable one-step response and providing notification.

With reference initially to FIG. 1, illustrated therein is an embodiment of the method of the present invention. The context for this description will be the following example: A user, such as a caregiver, desires to send a reminder that a particular action takes place, such as person under their care taking scheduled medication, and requires verification that the action has, in fact, taken place. While there are a great many other scenarios in which the present invention may be employed, this example provides a foundation for explanation and discussion.

The method illustrated in FIG. 1 begins with the sending user (or sender) selecting a gateway for composing and transmitting a message. Examples of such gateways include, but are not limited to, creating a message with response code via a web based user interface, an interactive voice response (IVR) system, by interacting with a live agent, or directly controlling an SMS server through a terminal such as a handset, a dedicated device or computer. Of particular note is the web interface, wherein the sender can conveniently create a reminder message and response code in a simple process, without the need for separate authoring tools for a message and associated response code (although the method using separate tools is within the scope of the present invention). With regard to the IVR system, the sender can create a message by methods including but not limited to using a series of menus or provide answers as defined by the IVR system itself. The responses of the sender to the questions or the selections of the options in the menu are translated into SMS code, both for the message body and the response code. Another gateway as mentioned above is by interacting with a live agent wherein the sender answers questions from or instructs the agent with regard to composition and transmission of the message and response code. In one example, the live agent can itself be using one of the other gateways, such as the above mentioned web interface.

Once a gateway has been selected, the sender then composes (by methods appropriate for that gateway) a message (or several serial messages) with response code at step 102. Once composed, the message may be sent to the desired recipient(s). The message can be sent at a specified time, or immediately after composition. And while the code employed to enable the response feature of the present invention is preferably sent with the message text that response code may be sent separately from the message text, such as at a later time or date. Furthermore, once received at the receiving station (e.g., the recipient's cellular phone), either or both of the message text and response may be displayed at a selected time. For example, the message to be displayed at some precise hour, say 3:00 pm, and the reminder to be displayed 1 hour later, say 4:00 p.m.

Once received, at step 104, the message text may be displayed on the receiving station's display device (e.g., cellular phone screen) by methods well known in the art, and the response code interpreted to cause the programming of a key, such as a softkey, in the phones computational/display memory. In so doing, the programming code enables a simplified response on the part of the receiving party, such as a one step (or multi step) response by selecting a programmed softkey or other dynamically programmed (i.e., by the response code) key.

It should be noted here that the message and response code may be received directly by the intended receiver at their receiving station or by an intermediate device or system, such as a server, which directs the message and text to the receiving station with or without reformatting, translation, etc. Importantly, the response code must be received in a format which may be interpreted by code within the receiving station (discussed further below), in order to effectuate the response method of the present invention. Therefore, it may be necessary to take into account any in-stream modifications to which the composed message and response code will be subject.

The sending party is provided with the option of requiring a response from the recipient. If no response is required, once the message and response options are displayed the process is terminated, as indicated in the figure as End 106. If the sender requires a response from the receiver, the sender's system may be put into a state of awaiting a reply. If no reply is receive, a specified action may occur, such as notifying the sender or a third party, resending the message or an alternate message to the receiver, etc. In the event of a reply, the sender may be notified of the reply by any of a variety of gateways, including but not limited to SMS message, email, website posting, and phone call where the call can be live, pre-recorded or text to speech automated call. The content of the information provided back to the sender can vary from a simply notice that a reply was received to a summary of the original message and the corresponding answer of the receiver. In addition, the sender can request to be alerted (e.g., by an SMS message) if the receiver does not issue a reply.

Accordingly, for example, a caregiver may create a message (to be sent once or on a repeated basis) and specify several responses from which the person under their care (recipient) may choose. This message is sent to the recipient's cellular phone or dedicated device, and displayed as a text message (alternately, as an image, video, audio or other type of indication, depending upon the protocol used and capabilities of the various devices involved) with softkeys highlighted or other option choices provided for selecting one of the several provided responses. The recipient may respond, by activating an appropriate softkey or pressing the appropriate button, in which event the caregiver is alerted of the reply. If a response is required but not received within a preset time period, the caregiver may be notified and appropriate action taken, such as physically visiting the recipient. Accordingly, examples of this basic process, and devices for accomplishing same, including variations thereto, are described further below.

The receiving device for the SMS message is a wireless or wired device. It must have specific capabilities to be programmed with the necessary SMS codes that will be recognized to deliver the message and assign pre-determined answer keys. One such example that would accomplish this would be a microcontroller/processor like the ARM-based 16/32-bit ARM7TDMI-S processor with 10 bit A/D converter by Philip (Model # LPC2114).

The processor must also be programmable. The above-mentioned Philip processor uses on-chip boot-loader software to compile and program the necessary codes for incoming messages. Depending on the processor used, a variety of programming languages may be used. According to one embodiment of the present invention, the codes for the aforementioned device were programmed into the processor using C-language.

The programming of the processor chip must be in accordance with the format of the incoming message. While it may serve to alter other features to the phone, it must: provide a displayed question for the receiver, and; provide answers for this receiver which may be in the form of softkeys or other existing predetermined buttons.

The querying coded message must contain at least the question or statement comprising the body of the message, in text, and two or more responses to be automatically programmed into the softkeys or additional existing keys. A password may or may not be required for the phone to accept the command codes to begin the messaging and key programming process. An example of a coded message for acceptance and decoding by the receiving processor is as follows: SET QUERY <Will you be attending your appointment today?> <Yes> <No>. In this example, the phrase "SET QUERY" alerts the receiving processor that the message will contain the alphanumeric characters that will comprise an "active response" message and the corresponding response keys. In this examples, the data within the first pair of "< >" is the message to be displayed on the screen. Only what is displayed inside the first pair of "< >" need be presented on the display. The text with the following pairs of "< >" represent the text for the responses to be associated with keys on the receiving device. Software within the receiving device handles associating these responses with selected keys, either from code following the response options or instructions preprogrammed into the receiving device. The enabling of this message and the corresponding answer keys comes solely from the receiving device processor and does not require nor invoke a browser, web based application, WAP application, or similar, generalized software.

Additional coding may be appended to a message to implement other message management functions like a repeat message command if no answer is received. According to one embodiment, after the body of the message is constructed, a "*" will mark the end of the message definition and additional message commands may follow. Solely by way of example, message management commands may be added so that the message is repeated daily and then programmed to resend every 10 minutes after this receipt until answered by the sender. Using the message example above, the message would appear: SET QUERY <Will you be attending your appointment today?> <Yes> <No> * REPEAT <1> <13:00> <00:10>. In this example, the first pair of "< >" following the "*" represents the scheduling function. The "1" indicates daily repetition of the previous message (a "2" might indicate weekly, a "3" indicate monthly, and so on). The next set of "< >" represents the time at which the message will be resent or redisplayed. In this example, the sender wants the message to reappear daily at 1:00 PM. The final set of "< >" represents the idol repetition time—the lapse desired until the message is resent (or redisplayed) if no reply is received. This example shows a desired idol time of 10 minutes until the message is resent.

If the sender so chooses to queue a message already stored on the device, the coded SMS may be in a simple message format. The stored question (e.g. 1-1000) may have already associated defined answers. These answers may be overwritten if additional softkey definitions are provided in the SMS coding. For example, if the predefined responses are desired, the incoming SMS message may appear as follows: SET QUERY <239>. If the sending party wants to override the predefined answers the message may appear as follows: SET QUERY <239> <Good> <Bad>. The same additional message management code may be added after the "*".

The processor chip must also be programmed to formulate a proper response to be recognized by the server when the receiver replies to the message. This may be in a variety of formats depending on the specification of the receiving server. An example of a reply format would be <Question> <Answer>. The "question" would be the exact phrase that appeared on the receiver's display when the question first arrived. The answer in this case would be the function of the softkey imputed by the receiver.

Figure 2:
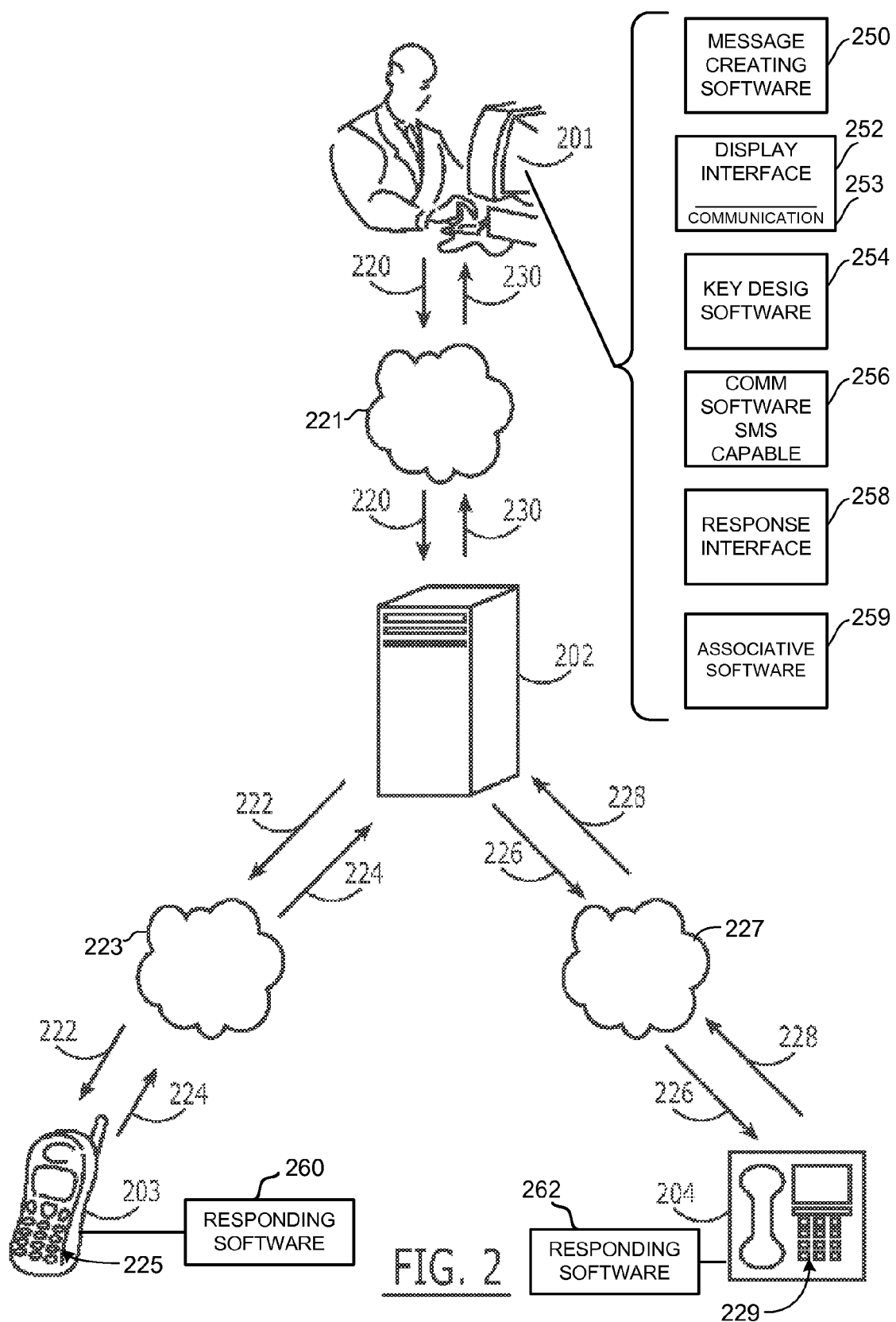
FIG. 2 is a diagram illustrating an example of the method described in FIG. 1 adopting specific devices and modes.
Figures 3, 4:
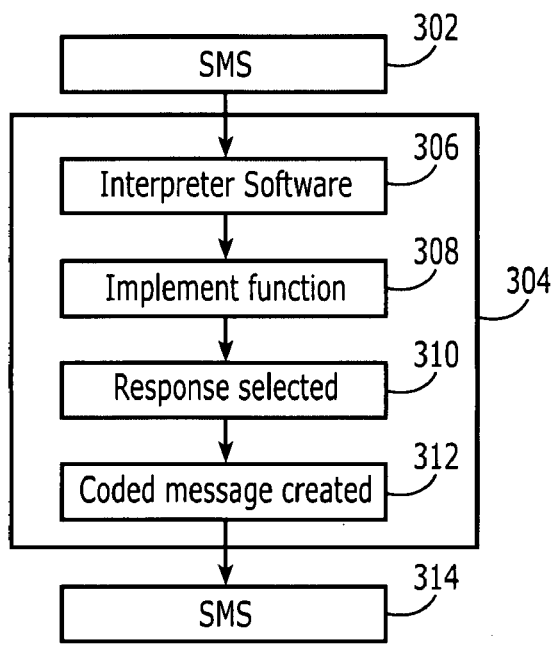
FIG. 3 is a flow chart illustrating the interaction between software components according to an embodiment of the present invention.
FIG. 4 is a diagram illustrating a Reminder Configuration inbox for web based interface to set the specifications of the outgoing message.

FIG. 2 illustrates an example of the method described above. In this example a sender creates a reminder message, for example "will you be attending your appointment today?", using a user station 201 embodying an Internet or web interface (or alternatively, a wireless device such as a cellular phone, through communications with an operator, etc.). At this point, the message may need not yet be translated to the proper code for causing the response functionality described above, thus making the process of creating the message relatively simple for the sender. The reminder message is sent to a server 202 through means including but not limited to wireless means 220 via a wireless network 221 wherein the server consists of data including but not limited to the configuration data which is set by the sender on the web interface accessible using user station 201. Examples of the reminder configurations are illustrated in FIG. 4 and FIG. 5, discussed in further detail below. Server 202 sends the programmed reminder message to the recipient device 203 using means including but not limited to wireless means 222 via a wireless network 223. The recipient device 203 parses the message, displays the text portion of the message, and interprets the code portion to program response keys, as described above. Server 202 may send the programmed reminder message to a recipient device 204 using another means 226 via another network 227. User station 201 may be equipped with or coupled with message creating software 250 permitting a user to create a message for display on a display device of a second user's station (e.g., recipient devices 203, 204) and at least two response options to the message. The message and the at least two response options may be formatted in a communication 253 for display on a display interface 252 included in or coupled with user station 201 without requiring or invoking a web browser. Recipient device 203 may have at least one entry key 225. Recipient device 204 may have at least one entry key 229. User station 201 may be equipped with or coupled with display interface 252 for displaying, for selection at user station 201, at least one format for the at least two response options. User station 201 may be equipped with or coupled with key designation software 254 which may automatically create code for causing a second user's station such as recipient devices 203, 204 to establish a predetermined association between at least one selected key of the at least one entry key 225, 229 on the second user's station with each respective response option of the at least two response options without requiring or invoking a web browser. User station 201 may be equipped with or coupled with a response interface 258 for specifying that a response is expected from a second user's station 203, 204 within a selected period of time. Response interface 258 may specify a certain action take place if an expected response is not received within the selected period of time. Response interface 258 may also include software which associates specification of an expected response, selected time period and specified certain action with the communication. User station 201 may be equipped with or coupled with associative software 259 which associates the message, the at least two response options, and code into communication 253 for display or for transmission (or for both display and transmission), for example, via wireless means 220. Communication software 256 may be coupled with or included with user station 201 for operating to present Short Message Service format messages. Communication software 256 may cooperate with message creating software 250 or associative software 259 (or both) to effect encoding the communication using SMS format. Second user's station 203 may include software 260 which, in response to the selection at second user's station 203 of a selected response option, cooperates with second user's station 203 to transmit the selected response to a selected party. Second user's station 204 may include software 262 which, in response to the selection at second user's station 204 of a selected response option, cooperates with second user's station 204 to transmit the selected response to a selected party.

Once the recipient has reviewed the message and selected a response, the response may be indicated by activating a response key (e.g., softkey) or permitting the receiver to press another key as defined in the message. Preferably, this activation is a one step response in which the response is both selected and transmission of the selected response to the sender is initiated, but it can also be in multiple steps as well. The response is transmitted to the server 202 via means including but not limited to wireless means 224. The server 202 on receiving the response from device 203 checks if the sender has requested notification of response, as described above. If the sender has not requested for notification, an action such as storing the response, tabulating like responses, etc. may be performed. If response notification has been requested, the server 202 retrieves a mapped response from a plurality of pre-formatted responses; if for example the response to the abovementioned message is "No", then the notification displayed to the sender can be a pre-formatted response such as but not limited to "No, I will not attend my appointment today." The notification is sent to the sender's device 204 (such as a land-line phone for voice indication, cellular phone for SMS notification or computer terminal for email or web-based notification). If the sender wants to send another reminder then the message is sent to the server 202 and the above described process is repeated for the new reminder message.

FIG. 3 is a flow chart illustrating the interaction between software components of the present invention. A coded message 302, for example according to the SMS protocol, is received by a receiving station 304. Interpreter software 306 within receiving station 304 interprets message 302, and issues commands to modify certain functions of station 304. These modifications are implemented by software 308. Once a response to the coded message is detected by appropriate software 310 within station 304, an appropriate message is created by software at 312, encoded for example in the SMS protocol. This message is then wirelessly transmitted, as previously described.

Reminder Configuration Setup

FIG. 4 illustrates an example of the Message (e.g., Reminder) Configuration inbox 401 illustrating some of the options available to the sender in configuring an outgoing message using the web interface. The "Date" field 402 can be used to set the date on which the message is to be sent by selecting the values from each of the scroll down options for the sub-fields wherein the available sub-fields are: month "mm"; date "dd"; year "yy"; hour of the day "hrs"; minutes "min"; and second "secs". The sender can select one of the available options in the scroll down list 404 for the "Questions" field, for example "Will you be attending your appointment today?" as illustrated in the figure. When the exact message that the sender desires is not available in Questions field 404, the "Other" field 406 can be used to create a custom message. The "Options" field 408 allows the sender to set the response choices which will be available to the recipient from the scroll down list, for example the recipient can have "Yes" or "No" to choose as a response to the reminder message. The "Other" option allows the sender to set new possible response options to the recipient by using the text box 410 labeled Option 1 and the text box 412 labeled Option 2. The "Frequency" field 414 allows the sender to set the same reminder to be sent to the recipient more than once, at a desired frequency. For example, by choosing the "Daily" option from the scroll down list, the recipient will receive the set message daily at a set time. Alternatively, the sender can select the store and replay check box 416, which will cause the message to be stored on the recipient's device and reappear on the device periodically at a pre-set time without requiring the server to send a new message (this feature may be disabled by the sender sending an appropriate message). The sender can choose to get the notification of the recipient's response by selecting "Add Notification" 418 and can save the set reminder configuration for future reference by selecting "Save" 420.

FIG. 5 illustrates an example of notification of response to the sender in the Message (e.g., Reminder) Configuration inbox 501. In box 501 allows the sender to set the notification preferences for the response given by the recipient of the original message. The notification inbox 501 illustrated in FIG. 5 is a specific example wherein the sender sets his preferences using the web interface as the gateway. Other gateways may be employed, as previously discussed. In the inbox 501, the sender can enter the name of the party to receive notice of the response at field 502, which can include the sender or any other person designated to receive the notification in field 502. The sender can select the "Mode" of reception of the notification at field 504, wherein the modes provided include, but are not limited to, email, SMS, Web posting or phone. If "email" is selected as the mode of reception of the notification, the sender enters the complete email address in the "email" field 506 to which the server needs to send the notification. If the sender selects the SMS mode to receive the notification, data for the "Phone (SMS)" field 508 has to be entered, including a phone number to which the notification is to be sent. If the sender selects phone call as the mode of receiving the notification, then the phone number of the recipient of the notification should be entered in the "Phone (Call)" text box 510.

The Reminder Configuration for notification inbox 501 further provides the sender with the option to set the notification process wherein after notification, further messages may be sent to the same or additional recipients. To invoke this option, the sender can select either the option "Yes" or "No" from the scroll down list provided in the "Reply function" field 512. If the sender chooses to send another reminder message, then the aforementioned process may be repeated. The notification inbox 501 further provides the option to include another person to be notified of responses from the recipient by selecting the "Add Another Person to Notify" field 514, and to save the preferences set in the notification inbox 501 by selecting the "Save" field 516.

Figure 6A:
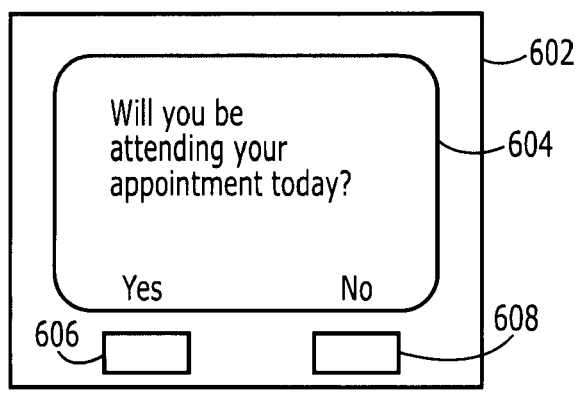
FIGS. 6A, 6B, 6C illustrate some examples of the display of the reminder message to the receiver on mobile device.

In the following examples, it will be assumed that a message recipient uses an "active response" enabled cellular phone, that is, a cellular phone in which the SMS code interpreter software is installed and running. As mentioned herein, however, other active response devices are also contemplated within the scope of the present invention. FIG. 6A illustrates an example of a reminder message received by a recipient. The message "Will you be attending your appointment today?" is displayed on the display panel 604 of the recipient's cellular phone 602. The options "Yes" and "No" are also displayed. Transparent to the user, the message sent by the sender included code that not only caused the display of the text question and the yes/no response options, but also caused the "yes" option to be associated with key 606 and the "no" option to be associated with key 608 such that when one of these keys are depressed the user's cellular phone generates and sends as a reply either yes or no, accordingly. As shown, the active keys are directly below the options associated therewith, but they may be positioned anywhere about the perimeter of the display provided the association between key and response is clear. Thus, in this case the recipient of said message has only two options displayed and can select either one of them by pressing the corresponding activated softkey.

Figure 6B:
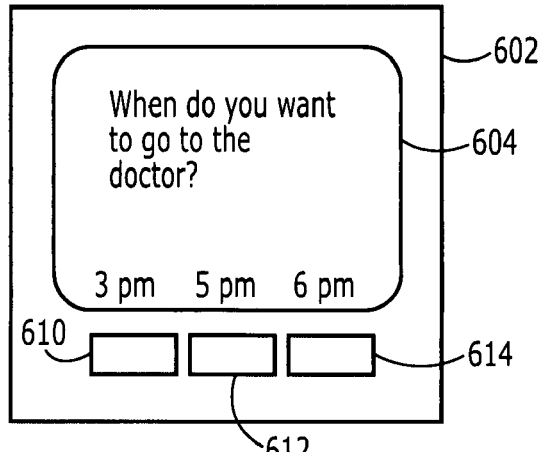

FIG. 6B illustrates another example of a reminder message received by a recipient wherein said "active response" enabled communication device is the recipient's cellular phone. Here, the displayed message is "When do you want to go to the doctor" and the options 3 pm, 5 pm, and 6 pm are displayed as set by the sender in the Reminder Configuration inbox 401. The softkeys 610, 612, and 614, which are directly below each of the displayed options, correspond to each of said options, and are activated by the abovementioned method wherein the recipient can select the response by activating (e.g., depressing) any one of the activated keys thereby sending the corresponding option as the response to the message.

Figure 6C:
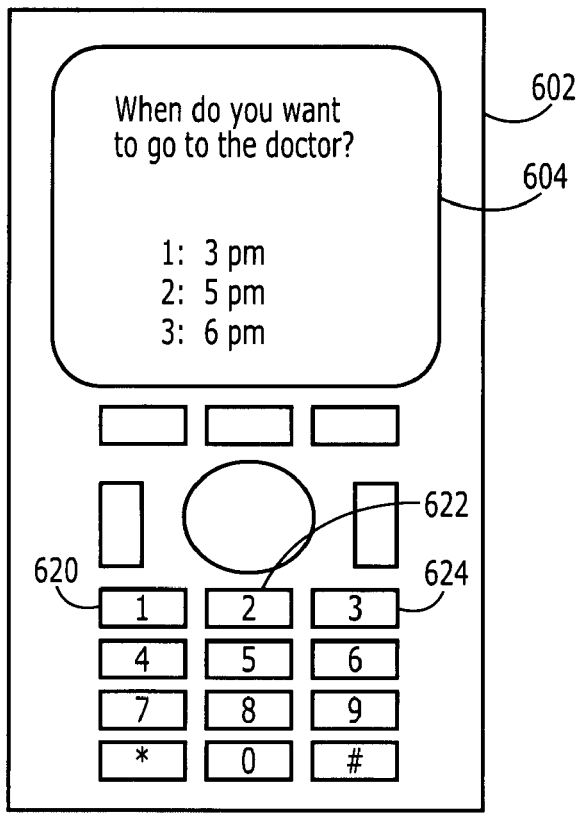

FIG. 6C illustrates another example of the reminder message received by the recipient wherein said "active response"

enabled communication device is the recipient's cellular phone. Here, the message "When do you want to go to the doctor" is displayed, and the options 3 pm, 5 pm, and 6 pm are displayed as set by the sender in the Reminder Configuration inbox 401. In this example, keys other than softkeys are activated for the response, the active keys being mentioned with the corresponding options, here the "1" key 620 represents 3 pm, the "2" key 622 represents 5 pm, and "3" key 624 represents 6 pm. The recipient of the reminder selects one of the above options by pressing the corresponding key, thereby sending the corresponding option as a response to the message.

Notification

Figure 7:
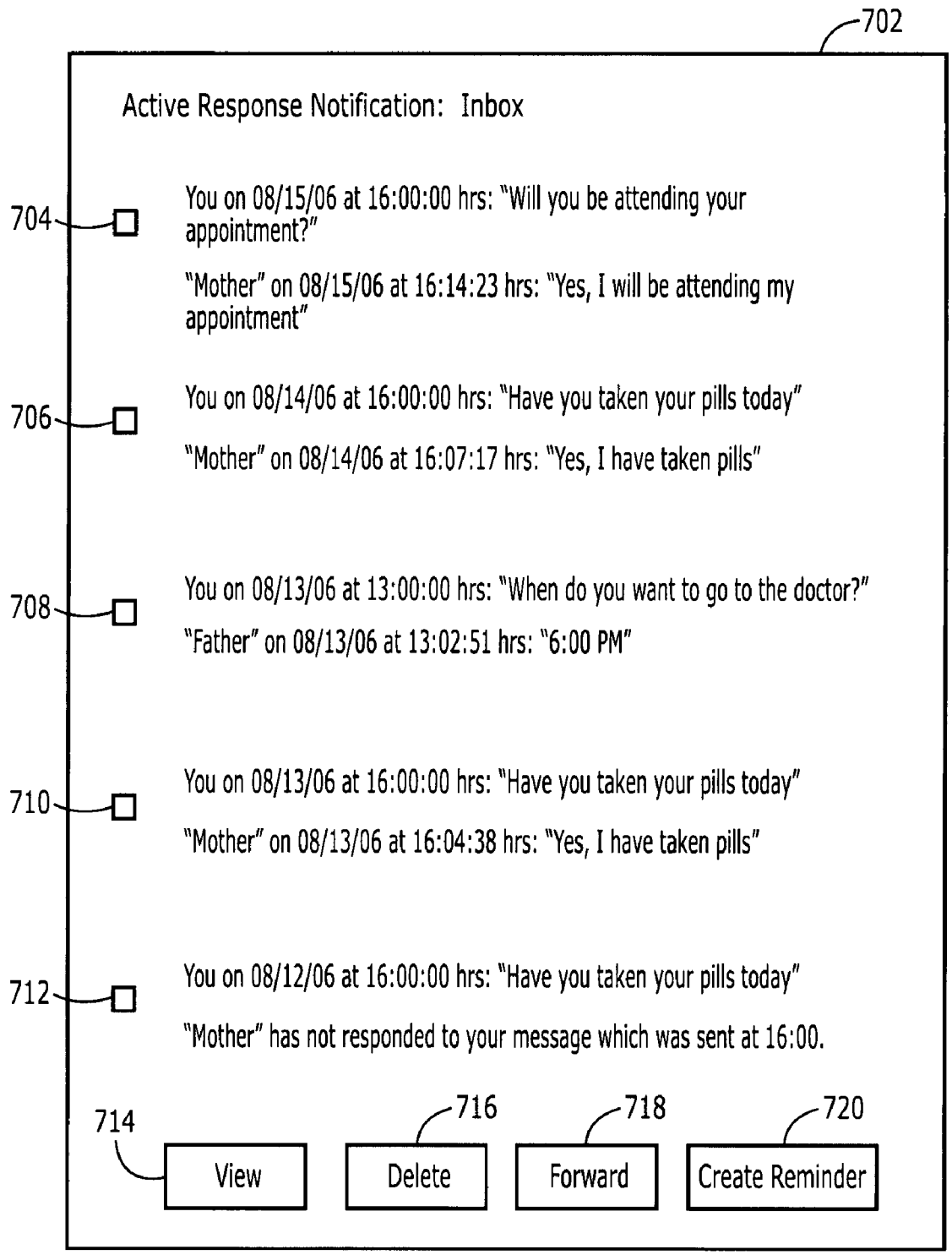
FIG. 7 illustrates the example of an Active Response Notification Inbox for the received notifications which is web based.

FIG. 7 illustrates the Active Response Notification Inbox 702 which is displayed to the recipient of the response notification (usually, the sender of the original message) using the web mode. The notification history as displayed in FIG. 7 includes a summary of the reminder message sent to the recipient and a summary of the response notification received in return. An example of the brief of the notification from the list is "You on 08/15/06 at 16:00:00 hrs: "Will you be attending your appointment?" wherein "You" is the sender of the original message; "08/15/06 at 16:00:00" specifies the date and time the message was sent by the sender; the text in double quotes is the exact message sent to the recipient. Further, in the above example, the line which follows the above mentioned line: "Mother" on 08/15/06 at 16:14:23 hrs: "Yes, I will be attending my appointment" gives a brief summary of the identity of the recipient and the corresponding response. In this example "Mother" is the recipient of the reminder message, "08/15/06 at 16:14:23 hrs" is the date and time the recipient responded to the message, for example by pressing a selected key of the "active response" enabled communication device; the sentence in double quotes is the actual response.

With the interface shown in FIG. 7, the user may select on or more of the communications in the history list by clicking on its check box 704-712, then selecting the appropriate action from the choices provided, such as View, Delete, Forward and Create Reminder 714-720, respectively. The "View" option 704 allows the recipient of the notification to view the message and response in further detail. The "Delete" option 716 allows the recipient of the notification to delete the selected messages from the list of FIG. 7. The "Forward" option 718 allows the recipient of the notification to forward the selected messages to a specified email address. The "Create Reminder" option 720 allows the recipient of the notification to create a new reminder message in accordance with the method described above.

The final entry in the history list of FIG. 7 illustrates an example in which a message has been sent with a response required within a set period of time, with no response received. In the second line of this entry, "Mother has not responded to your message which was sent at 14:00" indicates that "Mother" has not responded within the prescribed time. In such an event, a specified action may take place, such as the server sending an email or placing a phone call, or the sender may manually take a similar action, attempt to contact or make an in-person visit to the recipient, etc.

The notification of the response to a message may also be sent to parties specified in accordance with the preference set as described above. According to one mode of receiving a response to a message is by way of an SMS message delivered to the sender's cellular phone. The following examples illustrate some of the different formats of the notification according to the preference set by the sender and exemplary additional options available to the receiver of the notification. It will be appreciated that while the present description relates to a sender receiving a response (or equivalently, notification of a response), any third party (or server) may equivalently be the receiver of the response/notification of response.

Figure 8A:
FIGS. 8A, 8B, 8C illustrate some examples of the formats of the notification on the notification recipient's mobile device.

FIG. 8A illustrates the notification on the display panel 804 of the sender's cellular phone 802, wherein the message is "Will you be attending your appointment?", the time elapsed since sending the message is shown as "2 hrs". The response of the recipient of the message is "Yes, I will be attending my appointment."

Figure 8B:
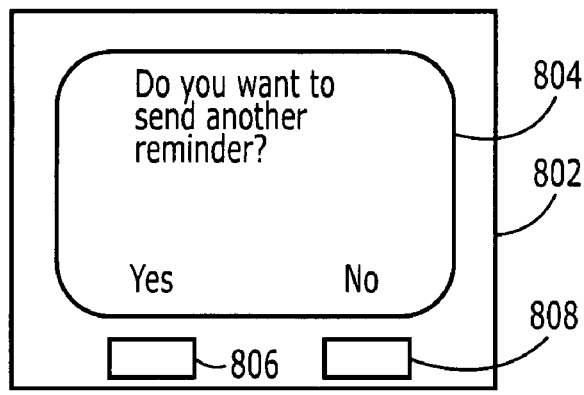

FIG. 8B illustrates the display panel 804, illustrating a follow-on message generated by software associated with the sender's system or server, querying if the sender would like to send another reminder. The options provided are "Yes" and "No" associated with activated softkeys 806 and 808, by methods well known in the art. If the user selects "yes" by activating button 806, a message is sent to the sender's system or server which causes a resending of the original message in accordance with the description above.

Figure 8C:
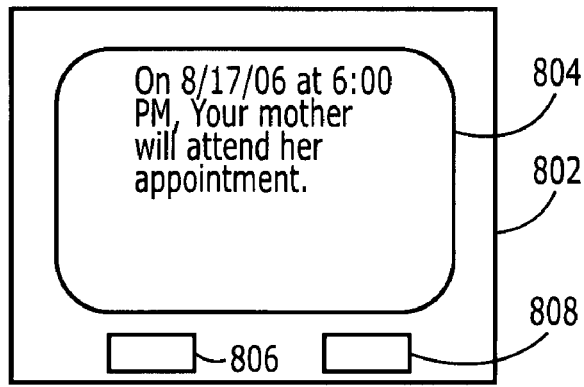

FIG. 8C displays yet another notification format wherein the reminder message is not displayed, but a brief summary of the response is provided. In this example "On 08/17/06 at 6:00 PM" is the time of the response and the mapped response by the server as described hereinabove is "Your mother will attend her appointment."

While a plurality of preferred exemplary embodiments have been presented in the foregoing detailed description, it should be understood that a vast number of variations exist, and these preferred exemplary embodiments are merely representative examples, and are not intended to limit the scope, applicability or configuration of the invention in any way. For example, the receiving station may be programmed to automatically generate a message to which the receiver is requested or expected to reply. Such a reply will be delivered to the designated destination (e.g., a care provider) despite the fact that the message itself originated a the receiving station. Thus, the foregoing detailed description provides those of ordinary skill in the art with a convenient guide for implementation of the invention, and contemplates that various changes in the functions and arrangements of the described embodiments may be made without departing from the spirit and scope of the invention defined by the claims thereto.

What is claimed is:

1. A method of facilitating information exchange between two users, comprising:

creating, at a first user's station, a message for display on a display device of a second user's station and at least one response option to the message, said message and said at least one response option being formatted for cooperating with said second user's station to effect said display at said second user's station without requiring or invoking a web browser; said second user's station having at least one entry key;

displaying, for selection at said first user's station, at least one format for said response options;

automatically creating code for causing the second user's station in response to the second user's station receiving the message to establish a predetermined association between at least one selected key of said at least one entry key on said second user's station and said at least one response option without requiring or invoking a web browser;

associating said message, said at least one response option, and said code into a communication; and transmitting said communication to the second user's station.

2. The method of claim 1, further comprising the steps of:
receiving said communication at the second user's station;
operating on said communication to effect display of said message and said at least one response option, and employing said code to effect displaying said at least one response option at the second user's station in the predetermined association.

3. The method of claim 2, wherein the communication is periodically automatically retransmitted to the second user's station.

4. The method of claim 2, wherein the communication further includes code which causes the second user's station to periodically repeat the display of said message and said at least one response option in the selected format.

5. The method of claim 2, wherein said message and at least one response option are periodically redisplayed on said second user's station without retransmission from said first user's station.

6. The method of claim 1, further comprising the steps, prior to transmitting, of:
providing an interface for specifying that a response is expected from the second user's station within a selected period of time;
providing an interface for specifying that a certain action take place if an expected response is not received with the selected period of time; and
associating said specification of an expected response, selected time period, and specified certain action with said communication.

7. The method of claim 1, wherein the communication is encoded according to the short messaging standard (SMS) protocol prior to transmission.

8. The method of claim 2, further comprising the steps of:
selecting, at the second user's station, a selected response option of said at least one response option by physically interacting with the second user's station; and
transmitting the selected response option to a selected party.

9. The method of claim 8, wherein the selected party is the first user's station.

10. The method of claim 8, wherein the selection and transmission of a selected response option is accomplished in one step by activating a single said selected key on the second user's station associated with the selected response option.

11. The method of claim 1, further comprising:
said at least one format being a display of text representing said at least one response option and said predetermined association of said at least one selected key on said second user's station with each respective response option of said at least one response option; effecting said selection of a selected format of said at least one format directing that activating said at least one selected key associated with said selected format results in selection of the associated respective response option at said second user's station.

12. The method of claim 11, wherein said at least one selected key is a programmable general purpose key forming a part of said second user's station.

13. The method of claim 11, wherein said at least one selected key is a soft key at said second user's station.

14. A system facilitating communication between two users, comprising:
a first user's station provided with software permitting a user to create a message for display on a display device of a second user's station and at least two response options to the message; said message and said at least two response options being formatted for display without requiring or invoking a web browser; said second user's station having at least one entry key;
an interface for displaying, for selection at said first user's station, at least one format for said at least two response options;
software associated with the first user's station which automatically creates code in response to the second user's station receiving the message for causing the second user's station to establish a predetermined association between at least one selected key of said at least one entry key on said second user's station with each respective response option of said at least two response options without requiring or invoking a web browser;
software which associates said message, said at least two response options, and code into a communication; and
a networked connection permitting the transmission of said communication to the second user's station.

15. The system of claim 14, further comprising:
memory located at the second user's station for receiving said communication;
a display unit operating on said communication to effect display of said message and said at least two response options; and
interpreter software for employing said code to effect displaying said at least two response options at the second user's station in the predetermined association.

16. The system of claim 15, wherein said at least two keys are soft keys.

17. The system of claim 15, further comprising:
software which transmits, in response to the selection at the second user's station of a selected response option of said at least two response options by physically interacting with the second user's station, the selected response option to a selected party.

18. The system of claim 17, wherein software which accomplishes the selection and transmission of a selected response option in one step by activating a single said selected key on the second user's station associated with the selected response option.

19. The system of claim 14, further comprising software which encodes the communication according to the short message service (SMS) protocol prior to transmission.

20. The system of claim 14, further comprising:
at least two keys forming a part of said second user's station; and
software for associating text representing said at least two response options with said at least one selected key among said at least two keys effecting said selection of a selected format of said at least one format directing that activating said at least one selected key results in selection of the associated respective response option at said second user's station.

21. The system of claim 14, further comprising:
an interface for specifying that a response is expected from the second user's station within a selected period of time;
an interface for specifying that a certain action take place if an expected response is not received within the selected period of time; and
software which associates said specification of an expected response, selected time period, and specified certain action with said communication.

* * * * *